United States Patent
Cowart et al.

(10) Patent No.: US 6,758,250 B2
(45) Date of Patent: Jul. 6, 2004

(54) LUBRICANT RELEASE SYSTEM

(75) Inventors: David Cowart, Anderson, SC (US); Jean-Pierre Cowart Pompier, Greenville, SC (US)

(73) Assignee: Michelin Recherche et Technique S.A. (CH)

(*) Notice: Subject to any disclaimer, the term of this patent is extended or adjusted under 35 U.S.C. 154(b) by 0 days.

(21) Appl. No.: 10/447,848

(22) Filed: May 29, 2003

(65) Prior Publication Data

US 2003/0221761 A1 Dec. 4, 2003

Related U.S. Application Data

(60) Provisional application No. 60/385,126, filed on May 31, 2002.

(51) Int. Cl.⁷ .................. B60C 17/04; B60C 17/10
(52) U.S. Cl. .................. 152/158; 152/520; 152/521
(58) Field of Search .................. 152/158, 520, 152/521

(56) References Cited

U.S. PATENT DOCUMENTS 4,212,339 A * 7/1980 Dobson .................. 152/158

* cited by examiner

*Primary Examiner*—Adrienne C. Johnstone
(74) *Attorney, Agent, or Firm*—Felipe J. Farley; Christopher P. Crecente; Alan A. Csontos

(57) ABSTRACT

The present invention is a pneumatic tire and wheel system comprising: a wheel including a rim; mechanically secured to which is an annular insert and a pneumatic tire including an interior space; and a lubricant release system for release of lubricant into the interior space of the tire. The lubricant release system comprises: a sensor for sensing tire conditions; a transmitter for sending a first signal to; a computer for assessing the signal and sending a second signal to; an actuator mechanically secured to the wheel. The actuator includes: a receiver for receiving the signal; a reservoir for containing lubricant; an expulsion mechanism for expelling lubricant; and a power source for powering the expulsion mechanism.

6 Claims, 4 Drawing Sheets

Section A-A
View of Pressure Sensor

Section B-B
View of Lubricant Cartridge, Internal

LUBRICANT RELEASE SYSTEM

This application claims the benefit of provisional application No. 60/385,126 filed May 31, 2002.

FIELD OF THE INVENTION

The present invention is in the field of pneumatic tires, and more specifically relates to pneumatic tires having a supporting device for bearing the load when the tire is deflated.

BACKGROUND OF THE INVENTION

Upon partial or complete deflation of a pneumatic tire, the interior surface of the tire may come into contact with the wheel, greatly impeding control of the attached vehicle, and generating considerable heat that may degrade the structure of the tire. One approach to this problem has been to provide an annular insert. This annular insert, or support ring, may be a solid ring that supports the load of the wheel assembly upon deflation of the tire. However, this insert may also chafe the interior surface of the tire upon deflation, or even upon normal operation of the tire. Therefore, it has been proposed to lubricate the outer surface of the annular insert or the inner surface of the tire. However, this presents various difficulties. Liquid or solid lubricant loose in the interior of a tire may contaminate the bead area of the tire, leading to relative movement of the tire with respect to the rim. Liquid lubricant may also make balancing the tire more challenging. Therefore, there is a need for a tire and wheel assembly with an annular insert with a more readily manageable lubricant system.

SUMMARY OF THE INVENTION

The present invention is a pneumatic tire and wheel system comprising a wheel including a rim; mechanically secured to which is an annular insert and a pneumatic tire including an interior space; and a lubricant release system for release of lubricant into the interior space of the tire. The lubricant release system comprises: a sensor for sensing tire conditions; a transmitter for sending a first signal to; a computer for assessing the signal and sending a second signal to; an actuator mechanically secured to the wheel. The actuator includes: a receiver for receiving the signal; a reservoir for containing lubricant; an expulsion mechanism for expelling lubricant; and a power source for powering the expulsion mechanism.

DETAILED DESCRIPTION OF THE INVENTION

The present invention is a pneumatic tire and wheel system comprising a wheel including a rim; mechanically secured to which is an annular insert and a pneumatic tire including an interior space; and a lubricant release system for release of lubricant into the interior space of the tire. The lubricant release system comprises: a sensor for sensing tire conditions; a transmitter for sending a first signal to; a computer for assessing the signal and sending a second signal to; an actuator mechanically secured to the wheel. The actuator includes: a receiver for receiving the signal; a reservoir for containing lubricant; an expulsion mechanism for expelling lubricant; and a power source for powering the expulsion mechanism.

The present invention thus provides that lubricant will be released into the interior space of the tire only when necessary. Therefore, the tire bead remains free of lubricant contamination, and there is no risk of slippage of the tire on the wheel rim. Furthermore, since the lubricant is contained until needed, tire-mounting operations are greatly simplified: there is no challenge to confine the lubricant only to certain spaces within the interior of the tire during tire mounting. Since the system is electronically activated, after compilation of certain inputs, not mechanically activated, spurious signals like curb and pothole impacts are less likely to trigger release of lubricant. Finally, in one embodiment, most of the lubricant release system can be secured to the exterior of the rim, simplifying installation, monitoring, and maintenance of the system. In this embodiment, several lubricant release modules can be secured around the rim, preserving the balance of the tire.

In one embodiment of the invention, the power source provides the power to remove the barrier between the lubricant reservoir and the interior of the tire. In one embodiment of the invention, the gel reservoir is located on the wheel rim such that centrifugal motion of the tire can provide the force to expel the lubricant from the lubricant reservoir.

Figure 1:
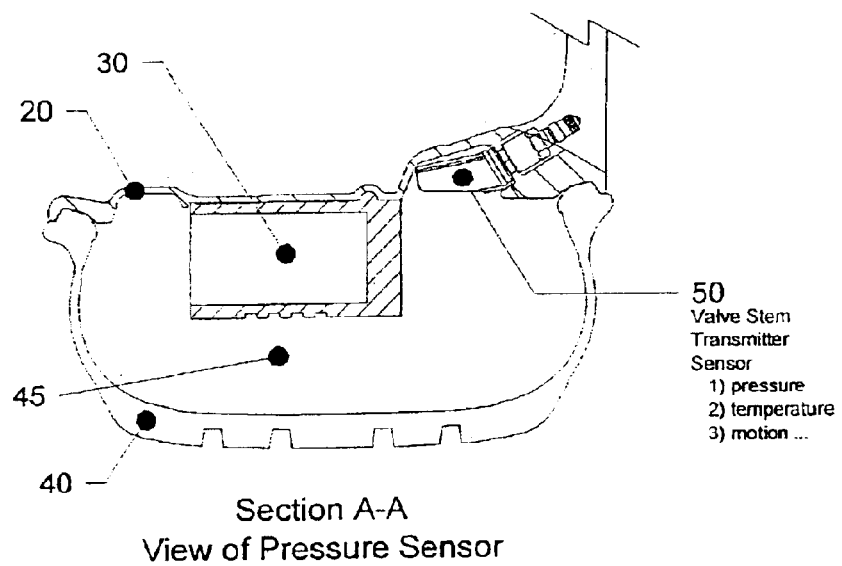
FIG. 1 (sections A—A and B—B) are illustrations of the present invention showing the tire, annular insert (or support ring), rim, sensor, transmitter, actuator, and lubricant reservoir.
Figure 1:
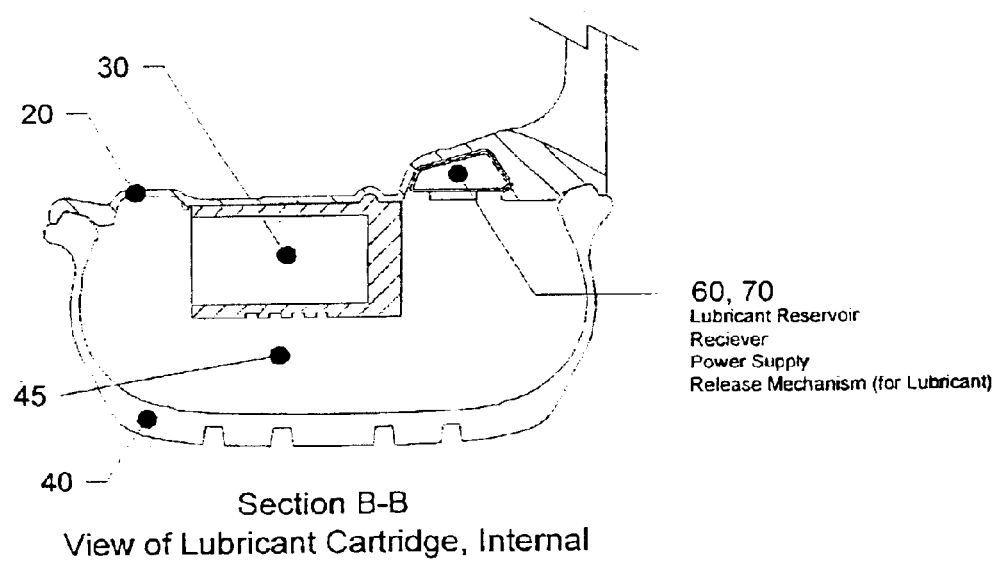

FIG. 1 illustrates the pneumatic tire and wheel system (10) of the present invention. Mechanically secured to rim (20) is pneumatic tire (40) and annular support ring (30). In the interior space (45) of the tire is sensor (50) and actuator (70). Sensor (50) may sense a variety of conditions of the tire, including, but not limited to: inflation pressure, forward motion of the vehicle, time profile of pressure release, and temperature. The sensing mechanisms may be electronic, chemical, or even piezoelectric or dielectric. Sensor (50) is in electronic communication with transmitter (55), which may transmit information either to a receiver in the vehicle (not shown), or to actuator (70). Actuator (70) provides for the actual release of lubricant in the interior (45) of the tire. Actuator (70) comprises a receiver, to receive the signal, a power supply, to power the lubricant release mechanism, and a computer, to analyze the signal and determine if lubricant should be released. The actuator is mechanically secured to lubricant reservoir (60), which, in one embodiment, is secured to rim (20). In one embodiment of the invention, the computer can be physically separate, but in electronic communication with actuator (70). For example, the computer (or microprocessor) may be physically located in the vehicle, rather than the tire. The computer might be the on-board pressure monitoring system of the vehicle. The computer accepts the various signals from transmitter (55) to determine if a sudden deflation event has occurred which warrants the release of lubricant. This calculation can include factors such as: proper inflation pressure for the particular tire; time profile of pressure release (sudden versus gradual); whether and at what rate the tire is rotating; and whether the vehicle engine is operating. This assessment of signals by the computer prevents spurious release of lubricant, such as when a curb is struck, or a tire is being changed.

In one embodiment of the invention, the actuator might be powered by a capacitor or a battery (not shown), such as a long-lasting lithium battery, which activates a cartridge of compressed gas (not shown) to expel the lubricant from the lubricant reservoir. In another embodiment of the invention, a battery might provide the energy to expel the lubricant from the lubricant reservoir. In another embodiment of the invention, the battery might operate a valve (not shown) allowing discharge of the lubricant into the interior space of the tire by means of centrifugal force.

Figure 2:
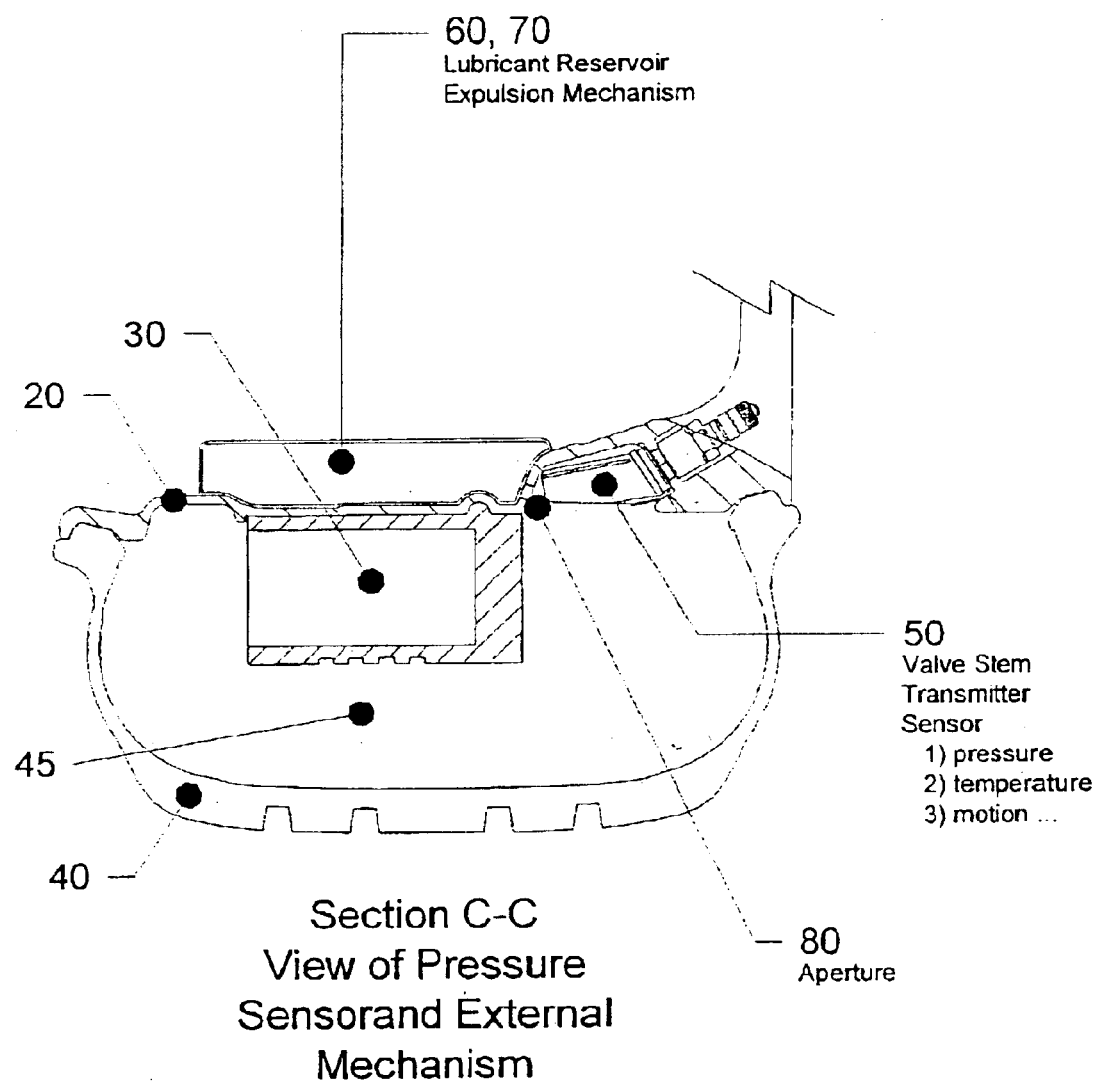
FIG. 2 is an illustration of the present invention showing the tire, annular support ring, rim, sensor, transmitter, actuator, and lubricant reservoir. In this embodiment the actuator and lubricant reservoir are located on the outside of the rim.

The lubricant release system might be situated in the interior space (45) of the tire, or as seen in FIG. 2, located outside the tire (40), fixed to the outside of the rim (20). Aperture (80) would place lubricant reservoir (60) in controlled fluid communication with the interior space (45) of the tire.

Lubricant (140) could be any of a number of appropriate liquid, gel, or dry lubricants, including, but not limited to: glycerol, glycerin, animal and vegetable oils, soaps such as sodium stearate, talc, and fluoroesters. In one embodiment of the invention, the lubricant is compatible with the materials forming the tire and the annular support ring.

Figure 3:
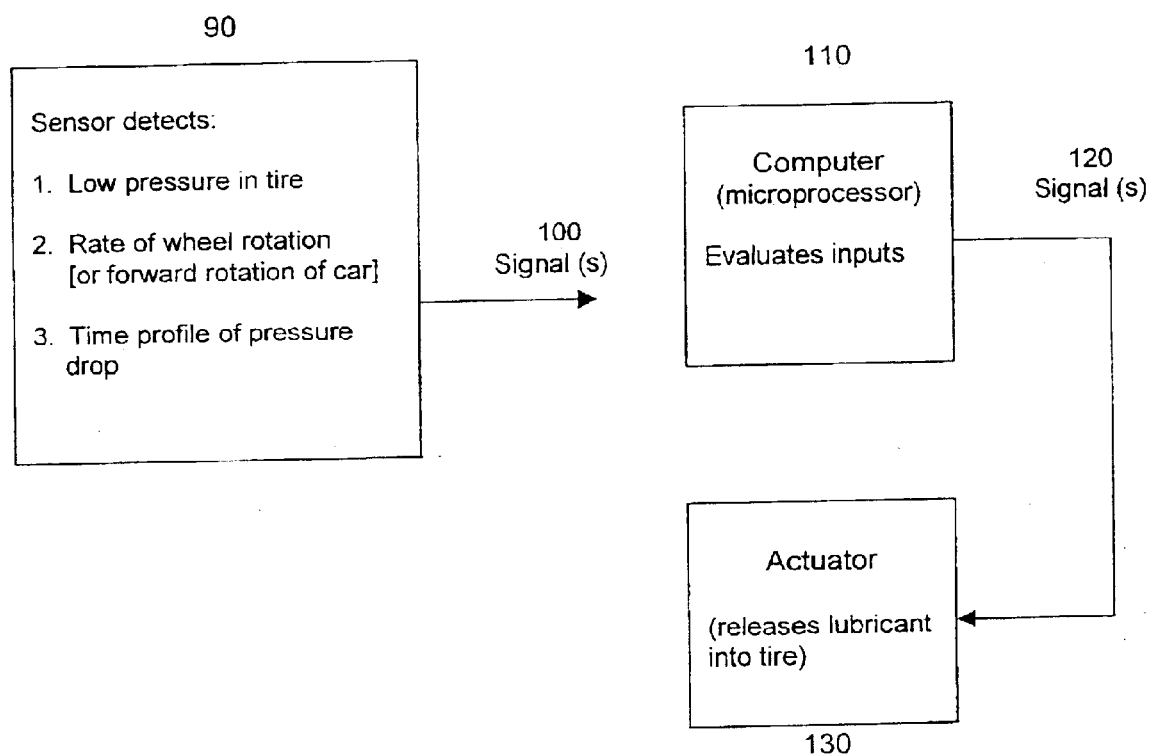
FIG. 3 is a flowchart of steps taken by the system before lubricant is released.

FIG. 3 shows steps in the activation of the lubricant release system. In block (90), the sensor, or sensors, detect conditions such as: low pressure in the tire, the rate of wheel rotation (or forward motion of the car), and the time profile of the pressure drop. A first signal (100) is made to a computer (microprocessor) in block (110). The first signal is evaluated to ascertain whether lubricant should be released, i.e., if a puncture is the likely situation. Then a second signal (120) is made to the actuator, which in block (130) prompts release of the lubricant into the tire.

Figure 4:
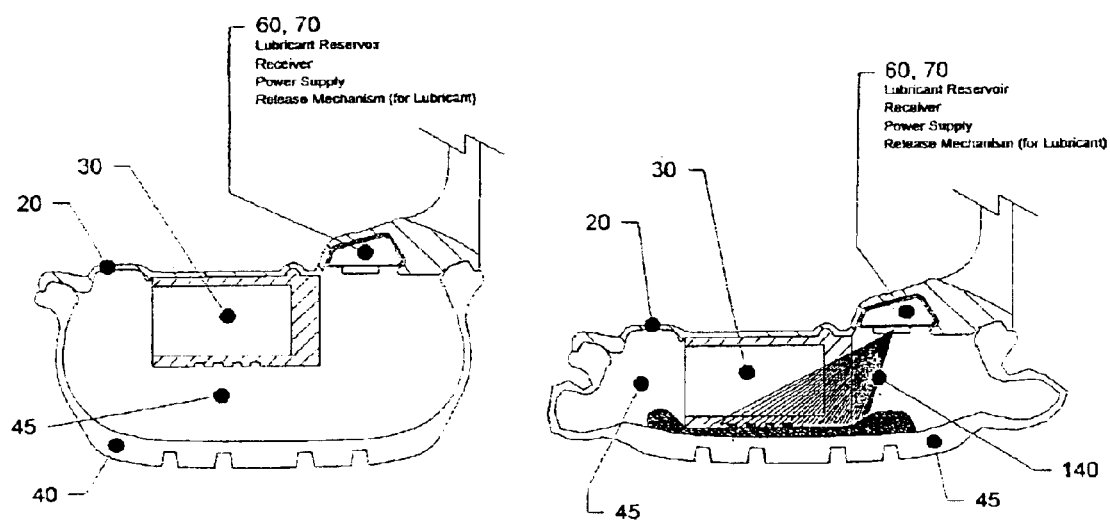
FIG. 4 illustrates the present invention showing the tire in the inflated state and the uninflated state as lubricant is being released.

FIG. 4 shows the pneumatic tire and wheel system (10) of the present invention in the inflated and uninflated states. In the uninflated state actuator (70) is shown releasing lubricant (140) into the interior (45) space of the tire (40).

Variations and modifications of the present invention will be clear to one of skill in the art after reviewing the foregoing specification and drawing. These variations and modifications are meant to fall within the scope of the appended claims.

I claim:

1. A pneumatic tire and wheel system comprising:
  (A) a wheel including a rim; mechanically secured to which is an
  (B) annular support ring; and a
  (C) pneumatic tire including an interior space; and a
  (D) lubricant release system for release of lubricant into the interior space of the tire; wherein the lubricant release system comprises:
    (i) a sensor for sensing tire conditions;
    (ii) a transmitter for sending a first signal to;
    (iii) a computer for assessing the signal and sending a second signal to;
    (iv) an actuator mechanically secured to the wheel, which includes;
      (a) a receiver for receiving the second signal;
      (b) a reservoir for containing lubricant;
      (c) an expulsion mechanism for expelling lubricant in response to the second signal; and
      (d) a power source for powering the expulsion mechanism.

2. The pneumatic tire and wheel system of claim 1, wherein the power source is selected from the group consisting of capacitors, batteries and compressed gas.

3. The pneumatic tire and wheel system of claim 1, wherein the lubricant release system is located in the interior space of the tire.

4. The pneumatic tire and wheel system of claim 1, further comprising wherein the lubricant release system is located outside the interior space of the tire, and is in fluid communication with the interior space of the tire via one or more apertures in the wheel rim.

5. The pneumatic tire and wheel system of claim 1, wherein the conditions are selected from the group consisting of inflation pressure, time profile of pressure loss, rate of wheel rotation, operating state of a vehicle engine to which the tire and wheel system is mechanically secured.

6. The pneumatic tire and wheel system of claim 1, further comprising wherein the power source operates a valve permitting release of lubricant from the lubricant reservoir by means of centrifugal force of the rotating wheel.

* * * * *

UNITED STATES PATENT AND TRADEMARK OFFICE
CERTIFICATE OF CORRECTION

PATENT NO. : 6,758,250 B2  Page 1 of 1
DATED : July 6, 2004
INVENTOR(S) : David Cowart and Jean-Pierre Pompier It is certified that error appears in the above-identified patent and that said Letters Patent is hereby corrected as shown below:

<u>Title page,</u>
Item [75], should read
-- Inventors:  David Cowart, Anderson, SC (US),
              Jean-Pierre Pompier, Greenville, SC (US) --.

Signed and Sealed this

Thirteenth Day of June, 2006

JON W. DUDAS
*Director of the United States Patent and Trademark Office*